Feb. 10, 1942. F. C. SNYDER 2,272,357
SCREW DRIVER
Filed July 17, 1940
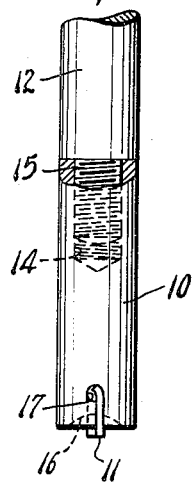
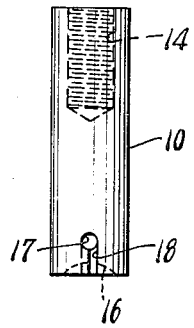
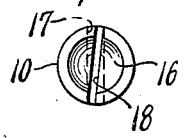
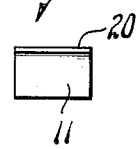
INVENTOR
FLOYD C. SNYDER
BY
ATTORNEYS Patented Feb. 10, 1942

2,272,357

UNITED STATES PATENT OFFICE 2,272,357

SCREW DRIVER

Floyd C. Snyder, Akron, Ohio

Application July 17, 1940, Serial No. 345,951

2 Claims. (Cl. 145—50)

This invention relates to screw drivers, and more especially it relates to screw drivers having replaceable blades or bits.

The invention is applicable to hand-operated screw drivers, but is of primary utility in its application to power-operated screw drivers. The latter are subject to great torsional strains, and for this reason usually are carefully constructed and accurately tempered to provide uniformity of strength and toughness. Notwithstanding such precautions, the screw drivers have limited life and are subject to mutilation and chipping, with the result that replacement costs are substantial, especially in situations where large numbers of screw drivers are in constant use.

The chief objects of the invention are to provide an improved screw driver of the type having a replaceable bit; to provide a replaceable bit for screw drivers of the character mentioned, which bit is constructed of tempered sheet metal; and to provide in a simple manner for mounting the bit in the holder and for retaining it therein under all conditions of use. Another important object of the invention is to secure the bit firmly in its holder without the use of extraneous securing means. Other objects will be manifest as the description proceeds.

Of the accompanying drawing:

Figure 1 is a side elevation of the improved holder and bit, and a driving structure on which it is mounted;

Figure 2 is a side elevation of the holder alone;

Figure 3 is an end elevation of the holder;

Figure 4 is a side elevation of the bit; and

Figure 5 is an end elevation of the bit.

Referring to the drawing, there is shown a holder 10, a bit 11, and a cylindrical member 12 to an end of which the holder 10 is attached. Said member 12 may be the shank or stock of an ordinary hand-operated screw driver, or it may be the driven shaft of a power-operated screw driver, either stationary or portable.

The holder 10 is a cylindrical structure of hardened steel, and is formed locally at one end with an internally threaded axial bore 14 by means of which it may be mounted upon a complementally threaded stem 15 projecting axially from the member 12. The opposite end face of the holder is recessed or dished at 16 so as better to fit over a round head screw. The dished end of the holder is formed with a diametric bore or aperture 17 near the end thereof, and with a transverse diametric kerf or slot 18 extending from the dished end of the holder to said bore 17. The bore 17 is of greater width than the slot 18, and the plane of the latter is disposed at a slight angle to the axis of said bore, with the result that the inner end of the slot, at opposite sides of the holder, merges with the bore 17 at opposite sides of the latter.

The bit 11 consists of a rectangular plate of tempered spring steel preferably substantially equal in length to the diameter of the holder 10. One longitudinal marginal portion 20 of the bit 11 is bent or offset at a slight angle to the remainder of the bit, as is best shown in Fig. 5. The bit is mounted in the holder 10 by inserting it edgewise into one end of the slot 18, with the bent portion 20 of the bit disposed within the bore 17. Considerable pressure is required to force the bit completely into the slot for the reason that the non-parallel arrangement of the bore 17 results in the progressive deforming or flexing of the leading end of bent portion 20 of the bit out of its normal angular position with relation to the remainder of the bit. The arrangement is such that friction of the leading end of bent portion 20 against the surface of bore 17 is sufficient to prevent accidental movement of the bit longitudinally of said bore, and the mechanical interlock of the trailing end of bent portion 20 with the bore 17 prevents removal of the bit from the holder in the direction of the axis of the latter.

The invention provides a screw driver in which the bit is readily removable when replacement is required, yet which is held firmly in position without extraneous securing means under all conditions of service. The bit is relatively inexpensive, thus resulting in reduced maintenance expense. Furthermore, because holder and bit are separate elements, superior hardening of each is possible, with resulting longer life thereof.

If the screw driver is to be hand-operated, the shank 12 and the holder 10 may be made in one piece. Accordingly, the term "holder" as set forth in the claims is used in a broad sense to include separable structures and structures that are integral with a driving shank or stock.

Modification may be resorted to without departing from the spirit of the invention, or the scope thereof, as defined by the appended claims which are not limited wholly to the specific construction shown.

What is claimed is:

1. A screw driver comprising a rectangular bit of tempered sheet metal and a holder for said bit, said holder being formed near an end thereof with a diametric bore and a slot of narrower width than the bore extending from the end of the holder to said bore, the plane of the slot being disposed at an angle to the axis of said bore, said bit being receivable endwise into said slot and having a marginal portion that is bent out of the plane of the bit, said marginal portion being receivable in the bore in said holder and being locally deformed by reason of the non-parallel arrangement of bore and slot whereby removal of the bit from the holder is resisted by mechanical interlock of said elements and friction resulting from said local deformation of the offset portion of the bit.

2. A screw driver comprising a rectangular bit of resilient sheet metal and a holder for said bit, said holder being formed near an end thereof with a diametric bore and a slot of narrower width than the bore extending to the bore from the adjacent end of the holder, the plane of the slot being at an angle to the axis of the bore, said bit having one marginal portion that is bent at an angle to the plane of the bit and is receivable in the bore of the holder when the bit is inserted endwise in the slot of the holder from the side thereof, to effect a mechanical interlock of the bit and holder, the non-parallel arrangement of the bore and slot effecting progressive deformation of the leading end of the bent portion of the bit as the latter is mounted in the holder and setting up friction between bit and holder that resists separation thereof.

FLOYD C. SNYDER.